United States Patent [19]

Hunt

[11] 3,765,815

[45] Oct. 16, 1973

[54] INJECTION MOLDING APPARATUS FOR PLASTICIZED MATERIAL

[75] Inventor: Charles J. Hunt, Morning View, Ky.

[73] Assignee: Vulcan Corporation, Cincinnati, Ohio

[22] Filed: Jan. 6, 1971

[21] Appl. No.: 104,258

[52] U.S. Cl. .............................. 425/244, 425/246
[51] Int. Cl. .............................................. B29f 1/02
[58] Field of Search ............. 18/20 H, 30 N, 30 PA, 18/30 PM, 30 PR, 30 PS, 30 AM, 30 JA, 30 AH; 425/242, 243, 244, 245, 246, 247, 119

[56] References Cited
UNITED STATES PATENTS

| | | | |
|---|---|---|---|
| 2,290,129 | 7/1942 | Moreland et al. | 18/30 RR X |
| 3,164,863 | 1/1965 | Hunt | 18/30 NÜ X |
| 2,777,164 | 1/1957 | Strahm | 18/30 NA |
| 3,173,176 | 3/1965 | Kobayashi | 425/246 |

FOREIGN PATENTS OR APPLICATIONS

| | | | |
|---|---|---|---|
| 1,325,875 | 3/1963 | France | 18/30 NW |
| 997,248 | 1/1952 | France | 425/246 |
| 399,733 | 3/1966 | Switzerland | 425/246 |

Primary Examiner—J. Spencer Overholser
Assistant Examiner—Michael O. Sutton
Attorney—Walter S. Murray

[57] ABSTRACT

Disclosed herein is a novel reciprocated injector needle device for introducing plasticized material into a mold, and turret type molding apparatus devised to cooperate with the injector needle device in an efficient and improved manner.

1 Claim, 5 Drawing Figures

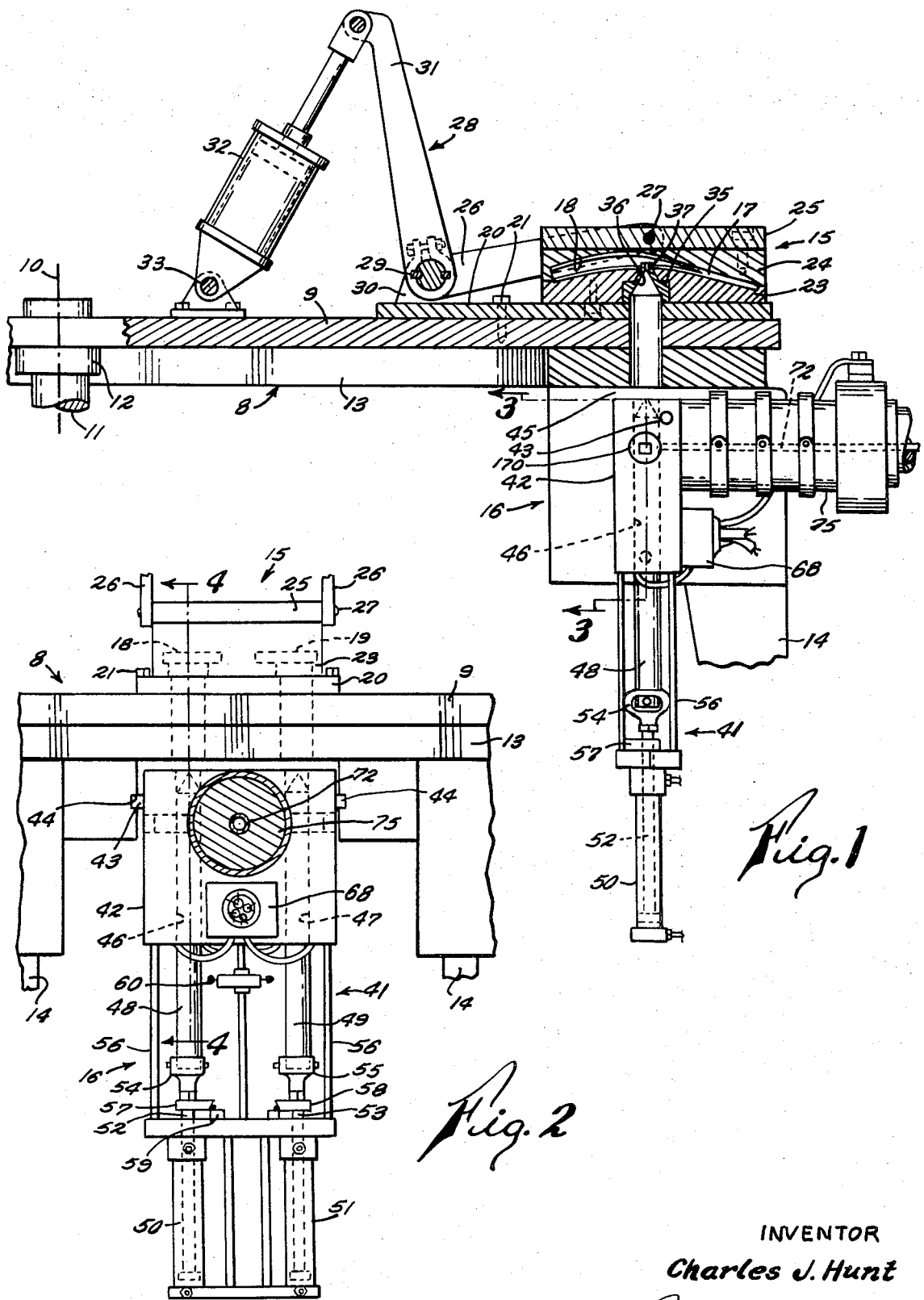

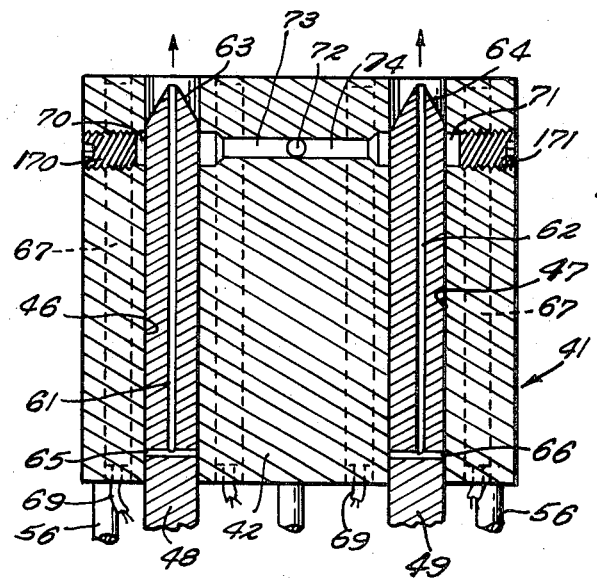
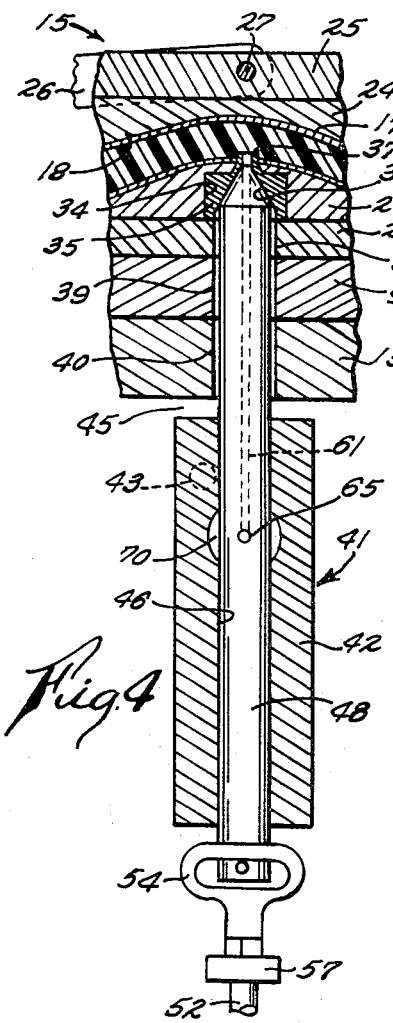
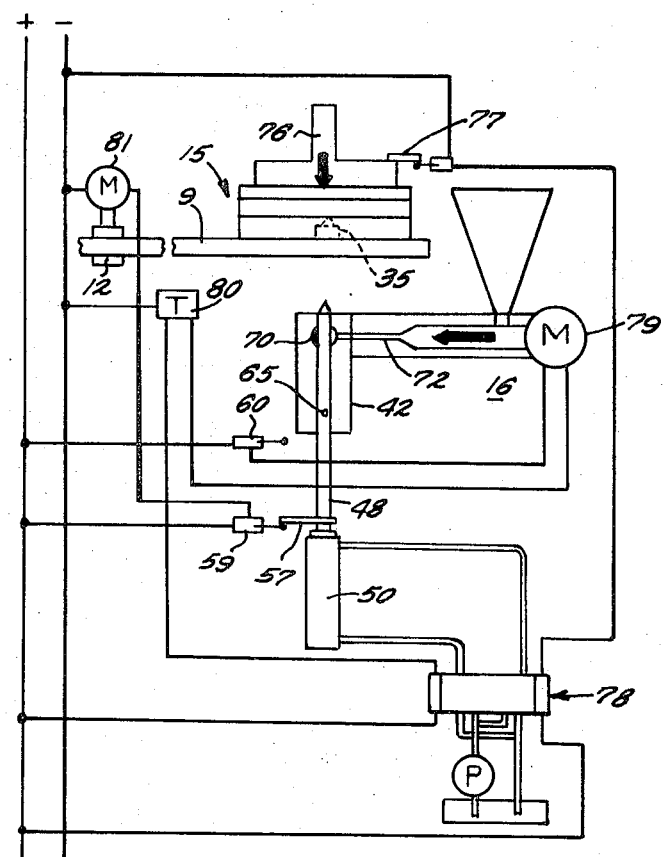

INJECTION MOLDING APPARATUS FOR PLASTICIZED MATERIAL

This invention relates to the art of injection-molding of plasticized material and is particularly directed to an improved injector means best adapted to cooperate in a novel manner with intermittently operated, conveyor type molding machines, or the like.

Previously, the continuous formation of thermoplastic articles in molds conveyed to an injection molding station by indexed turrets has been seriously handicapped by the fact that the molds opened and were gated at the mold parting lines and required not only expensive equipment but horizontally actuated injector devices and/or conveyors that had to be reciprocated vertically with a consequent inefficient use of power. It is therefore the main objects of this invention to provide a trouble free apparatus of the class described for economically manufacturing plastic articles in quantity; to provide an apparatus of the class described especially adapted to multi-station molding machines, and to provide an improved injector device for such apparatus.

Another object of the invention is to provide an axially movable injector means which operates a valve controlling the flow of plasticized material therethrough when the nozzle of the injector means is seated in the gate of a molding cavity.

Still another object of this invention is to provide an improved conveyor type injection molding machine for plasticized material capable of producing molded articles free of sprues and which is specifically designed to mold a pair of shoe insoles at a single station of the machine.

A further object of the invention is to provide an improved injector device that is trouble free and positive in operation and which is adapted when the injection process is completed to "freeze" break the sprue clean from the molded article.

Other objects of the invention will become apparent from the following specification taken in conjunction with the accompanying drawings which illustrate a preferred embodiment of the invention.

In the drawings:

FIG. 1 is a side elevational view of my injection-molding device depicted in association with a conventional turret type mold conveyor, parts of the latter being broken away and other parts shown in section.

FIG. 2 is a fragmental, front elevational view of the apparatus shown in FIG. 1.

FIG. 3 is an enlarged section taken on line 3—3 of FIG. 1.

FIG. 4 is an enlarged section taken on line 4—4 of FIG. 2.

FIG. 5 is a simplified, diagramatic view illustrating the controls and sequence of operations for the apparatus shown in FIGS. 1–4 of the drawings.

With particular reference to FIGS. 1 and 2 of the drawings, the numeral 8 generally refers to a turret type conveyor having an indexed turn table 9 rotated step-by-step around a vertical axis 10 by an intermittently actuated, conventional drive means (not shown) connected to a shaft 11 keyed to the hub 12 of the turn table. The turn table is supported upon a bolster ring 13 having a number of angularly spaced apart support legs 14 depending therefrom. A number of molds 15 are mounted in circumferentially-spaced relation around the periphery of the turn table 9 and each mold is moved to successive operating positions at a series of stations, including a mold injection station 16. Other periphery located stations disposed around the turn table may include a mold opened station for the insertion of a two-ply, felxible insole piece 17 FIG. 1) that is adapted to receive thermoplastic material between the plies, a mold closing station preceeding the injection station 16, several mold cooling stations following the said injection station and a discharge station at which the mold is opened and the completed shoe insole removed therefrom.

Preferrably each mold 15 has two side-by-side cavities 18 and 19 for simultaneously molding a "right" and a "left" insole blank for particular sized shoes. Each mold 15 comprises a base plate 20 mounted on the turn table by bolts 21, a lower die member 23 mounted on the base plate and an upper die member 24 mounted on a movable top plate 25. The top plate 25 is pivotally connected to a pair of arms 26—26 by a lateral pin 27 extending through the top plate and projecting laterally therefrom, said arms constituting parts of a bell crank device 28 (FIG. 1) fixed on a cross pin 29 in turn rotatably mounted in a bracket 30 extending upwardly from the base plate 21. The free arm 31 of the crank is pivotally connected to a fluid pressure cylinder 32 pivoted at 33 on the turn table 9, said cylinder acting as the motor means for opening the die members 23 and 24 or bringing them together for the molding operation.

As best shown in FIGS. 1 and 4 the lower die member 23 has a vertical opening 34 formed therethrough to receive a gate insert 35 having a downwardly opening conical seat 36 therein in communication with a gate in the form of a nipple 37 which extends into the mold cavity and preferably through an opening in the lowermost ply of the insole piece 17. It is also to be noted that the mold base 20, the turn table 9 and the bolster 13 have vertically aligned holes 38, 39 and 40, respectively, formed therethrough that are in fixed vertical alignment with the conical seat 36 in the insert 35 held in the lowermost die member 23 of the mold 15.

My injector device is generally referred to in the drawings by the reference numeral 41 and comprises a heated sink block 42 mounted beneath and spaced from the bolster 13 on a pair of trunions 43—43 projecting from opposite sides of the bolster and each received in a confronting groove 44—44 in adjacent legs 14. The space 45 serves to insulate the heated block 42 from the bolster 13. The block has a pair of vertical bores 46 and 47 formed therethrough for slidably receiving a pair of injector needles 48 and 49, respectively. The needles are vertically reciprocated by means of fluid motors 50 and 51, respectively, whose piston rods 52 and 53 are connected to the lower ends of said needles by loose couplers 54 and 55, respectively. As best shown in FIG. 2 the fluid motors are mounted to the underside of the heat sink block 42 by rods 56. Each connecting rod has a switch arm 57 and 58, respectively (FIG. 2) fixed thereon, each of which actuates upper and lower limit switches 59 and 60.

With particular reference to FIGS. 3 and 4, each needle 48 and 49 has an axial passageway 61 and 62, respectively, formed in its upper portion, the upper end of each passageway opening out into the apex of a conical nozzle end 63 and 64 formed on each needle, while the lower end of each passageway communicates with a cross passage 65 and 66 extending through an intermediate portion of each needle. The block 42 and the needles 48 and 49 are maintained at a plasticizing temperature by a plurality of electric heating elements 67 (FIG. 3) disposed in vertical bores in the block surrounding each needle and energized from an outlet box 68 mounted on the block and connected to the heating elements by lead wires 69.

Each bore 46 and 47 has an internal passageway 70 and 71 respectively, formed therearound, each of said passageways being connected to a main feed line 72 by branch lines 73 and 74, respectively. The passageways 70 and 71 are best formed in the block 42 by counterboring branch lines 73 and 74 to a larger diameter than the needles and closing the counter bore with threaded plugs 170 and 171, respectively. The main feed line in maintained at plasticizing temperatures by an electrically heated barrel 75, said main line communicating with a conventional plasticizing cylinder with a power operated pressure feed screw (not shown). The barrel is rigid on said plasticizing cylinder and is coupled to the block 42 to stabilize said block on its trunions 43—43.

It is to be noted that when the injector needles are in their lower or retracted limits of motion their upper portions are fully enclosed and in heat enchanging contacts with the interior walls of the bores in the heat sink block to maintain the material in the needle passageways in plasticized conditions and that the cross passageways in the needles are in valve closed positions relative to the internal passageways 70 and 71, in the block. When the fluid motors for the needles are operated said needles will pass upwardly through aligned openings in the bolster, the turn table, the mold base and into intimate contact with their respective conical seats in the gates for the lowermost mold dies and that the cross passageways 65 and 66 will be in registry with the passageways 70 and 71 in the block thus connecting the needle nozzles with the source of plasticized material introduced in the branches and main line in the block. After the mold injecting step the needles are returned to retracted positions closing the valve connection between the cross passageways 65 and 66 in the needles and the passageways 70 and 71 in the block.

In operation and with particular reference to FIG. 5 of the drawing the injector needle 48 is shown in retracted position within the heat sink block 42 and as turn table 9 is indexed to stop the mold 15 at the injector station 16 a mechanism associated with the table operates a conventional power means (not shown) which moves a clamp 76 down securing dies of the mold 15 which in turn closes a limit switch 77. The making of said switch 77 energizes a conventional solenoid operated, reversing valve 78 to direct pressure fluid into one side of the fluid motor 50 having the needle 48 into injecting positiion against the seat of the gate insert 35. Only one needle 50 and one mold cavity is shown in FIG. 5, it being understood that the electrical and fluid pressure controls for both the needles 48 and 49 are connected in series which operates said needles in unison.

As the needle 50 assumes its seated position in the gate insert 35 a micro-switch 60 is made by arm 57 which actuates a motor 79 to initiate operation of the pressure feed means of a plasticizer whereby thermoplastic material is forced through the main line 72 and through the needle 48 into the cavity of the mold 15, said microswitch also activating a delayed relay timer 80 set to provide a predetermined mold injection time and at the end of the timed period to energize the reversing valve 78 which returns the injection needle 48 to its retracted position within the heat sink block 42. As the needle reaches its retracted position the needle arm 57 makes the microswitch 59 to operate a turn table drive means 81 which indexes the table one step to bring the next succeeding mold 15 into position at the injection station 16 and the above described cycle is again instituted.

It is important to the successful operation of the process described that the degree of temperature of the plasticized material injected into the mold cavity by the needles be closely maintained with respect to the injection time controlled by the timer to secure a "freeze" break of the sprue within the molded shoe insole at the termination of the injection operation, so that no subsequent surface dressing of the completed insole is required; said temperature/time ratio being best determined by trial and error with the particular plastic material employed and other manufacturing procedures including prevailing factory temperatures.

Although the injection molding apparatus of this invention has been described in connection with the manufacture of shoe insole blanks of specified construction it will be understood that a variety of articles may be molded with the apparatus described by those skilled in the art without a departure from the invention set forth in the appended claims.

What is claimed is:

1. An injection molding machine for plasticized material comprising;
  a. a source of plasticized material under pressure,
  b. a turntable,
  c. a plurality of molds disposed circumferentially in angularly spaced apart positions on the turntable and each mold having at least an upper and a lower separable die member with a substantially horizontal parting line between the die members;
  d. a gate for each of the lower die members having a downwardly facing seat,
  e. an opening formed in the turntable in registry with each seat,
  f. an injection station beneath the turntable having a fixed, heated barrel connected to said source and adapted to maintain the material in a plasticized state,
  g. an injector nozzle having an axially extending material conducting passageway formed therethrough,
  h. a heated bearing block at the station beside the barrel having a bore therethrough receiving the nozzle for perpendicular axial movement from a normal position within the block to an extended injecting position,
  i. a passageway in the block connected to the barrel,
  j. power means for the turntable intermittently advancing each mold to a position at said station and adapted to bring the gate of the die member into axial alignment with the nozzle,
  k. a power actuated means operative during dwell periods of the turntable clamping together the die members of the mold disposed as said station,
  l. reciprocating power means connected to the nozzle and operative during dwell periods of the turntable to move the nozzle from the normal position within the barrel to the extended injecting position in contact with the seat of a mold at the station and return, m. and slide valve means between the block and the nozzle connecting the passageway in the nozzle with the passageway in the block when the nozzle is in extended position in contact with the seat of the nold at said station.

* * * * *